(12) United States Patent
Hoang

(10) Patent No.: US 8,291,996 B2
(45) Date of Patent: Oct. 23, 2012

(54) FLYING HOE

(76) Inventor: Thuan Van Hoang, Mountain House, CA (US)

( * ) Notice: Subject to any disclaimer, the term of this patent is extended or adjusted under 35 U.S.C. 154(b) by 0 days.

(21) Appl. No.: 12/370,484

(22) Filed: Feb. 12, 2009

(65) Prior Publication Data

US 2009/0223687 A1 Sep. 10, 2009

Related U.S. Application Data

(60) Provisional application No. 61/068,388, filed on Mar. 6, 2008.

(51) Int. Cl.
*A01B 1/10* (2006.01)

(52) U.S. Cl. .......................................... 172/375; 172/380

(58) Field of Classification Search .................. 172/371, 172/378, 380; 294/49, 51, 52; D8/10, 11; 56/400.05
See application file for complete search history.

(56) References Cited

U.S. PATENT DOCUMENTS

| | | | | | |
|---|---|---|---|---|---|
| 88,659 | A | * | 4/1869 | Munger | 172/381 |
| 199,481 | A | * | 1/1878 | Thomas | 172/375 |
| 215,077 | A | * | 5/1879 | Stone | 172/375 |
| 1,244,765 | A | * | 10/1917 | Oakley | 172/380 |
| 2,080,763 | A | * | 5/1937 | Cox | 172/375 |
| 2,109,488 | A | * | 3/1938 | Wegner | 172/375 |
| 2,140,911 | A | * | 12/1938 | James | 172/380 |
| 2,331,414 | A | * | 10/1943 | Morres | 172/375 |
| 2,497,506 | A | * | 2/1950 | McCaskill | 172/375 |
| 3,592,272 | A | * | 7/1971 | Perez | 172/375 |
| 4,334,583 | A | * | 6/1982 | Parker | 172/375 |
| 4,730,679 | A | * | 3/1988 | Tallerico et al. | 172/375 |
| 4,790,388 | A | * | 12/1988 | Badham | 172/375 |
| 5,004,053 | A | * | 4/1991 | Martell | 172/375 |
| 5,046,254 | A | * | 9/1991 | Russell | 30/309 |
| 5,425,226 | A | * | 6/1995 | Kaufman | 56/400.06 |
| 5,529,130 | A | * | 6/1996 | Suk | 172/380 |
| D373,293 | S | * | 9/1996 | Lockhart | D8/13 |
| 5,560,434 | A | * | 10/1996 | Janik | 172/378 |
| 5,699,700 | A | * | 12/1997 | Carmien | 76/113 |
| 5,810,408 | A | * | 9/1998 | Armstrong | 294/57 |
| D426,436 | S | * | 6/2000 | Ng | D8/10 |
| 6,311,783 | B1 | * | 11/2001 | Harpell | 172/380 |
| 6,988,561 | B1 | * | 1/2006 | Campbell | 172/380 |
| 7,350,839 | B2 | * | 4/2008 | Marquardt et al. | 294/60 |

FOREIGN PATENT DOCUMENTS

| | | | | |
|---|---|---|---|---|
| GB | 2041203 | A | * | 9/1980 |
| GB | 2124867 | A | * | 2/1984 |

* cited by examiner

*Primary Examiner* — Jamie L McGowan
(74) *Attorney, Agent, or Firm* — Edward C. Kwok; Haynes and Boone, LLP

(57) ABSTRACT

A hoe is provided which includes (a) a handle, (b) a cutting blade portion having a serrated cutting edge along a first side of the cutting blade portion and an additional cutting edge along a second side of the cutting blade portion, and (c) a reinforcing sleeve securing the cutting blade portion to the handle. The additional cutting edge may be 3-sided and honed on all sides. The serrated cutting edge may include numerous saw-teeth provided between two honed cutting portions. The hoe allows the user to cut vegetation or weeds at or near the ground level using a swinging motion similar to a golf stroke to avoid obstruction presented by overhead branches of a tree or small bush.

15 Claims, 7 Drawing Sheets

FLYING HOE

CROSS REFERENCE TO RELATED APPLICATIONS

The present invention relates and claims priority to U.S. Provisional Patent Application ("Provisional Patent Application"), Ser. No. 61/068,388, entitled "Flying Hoe," which was filed on Mar. 6, 2008, The Provisional Patent Application is hereby incorporated by reference in its entirety.

BACKGROUND OF THE INVENTION

1. Field of the Invention

The present invention relates to implements for gardening. In particular, the present invention relates to a hoe designed for home-owner or professional gardening use (e.g., cutting weeds, small limb or branches, and soil aeration around small plants).

2. Discussion of the Related Art

A typical garden hoe is used for eliminating weeds, cutting or pruning branches of a small bush or tree, or for aerating soil at the base of a plant. To use the typical garden hoe, a worker who stands upright uses a vertical over-head chopping motion to bring the blade down to the vegetation. However, many individuals have found it difficult to use a typical hoe to work on vegetation by or near a tree trunk, because the tree trunk or the tree's branches obstruct the vertical over-head chopping motion.

SUMMARY

According to one embodiment of the present invention, a hoe includes (a) a handle, (b) a cutting blade portion having a serrated cutting edge along a first side of the cutting blade portion and an additional cutting edge along a second side of the cutting blade portion, and (c) a reinforcing sleeve securing the cutting blade portion to the handle. The additional cutting edge may be 3-sided and honed on all sides. The serrated cutting edge may include numerous saw-teeth provided between two honed cutting portions.

In one embodiment, the cutting blade portion includes a cutting plate connected to a locking plate, the locking plate being provided for securing the cutting blade portion to the handle. The locking plate may be inserted into a slot provided in the handle, with through-holes being provided in the locking plate, the reinforcing sleeve and the handle, so as to allow the cutting blade portion to be secured to the handle by rivets or by nuts and bolts. A reinforced portion may be provided between the cutting plate and the locking plate. A curved portion may be provided to connect the reinforced portion to the cutting plate. In one embodiment, the reinforced portion and the cutting plate form a 60°-85° angle therebetween. The cutting plate and the curved portion may be formed by bending out of a single sheet of metal. Alternatively, the cutting plate may be welded to the curved portion.

In one embodiment, the reinforced portion is provided a reinforcing plate welded to the locking plate for additional strength. For additional structural integrity, the reinforced portion may include a rectangular cut-out, or a deformation formed by striking.

The present invention is better understood upon consideration of the detailed description below and the accompanying drawings.

DETAILED DESCRIPTION OF THE PREFERRED EMBODIMENTS

Figure 1:
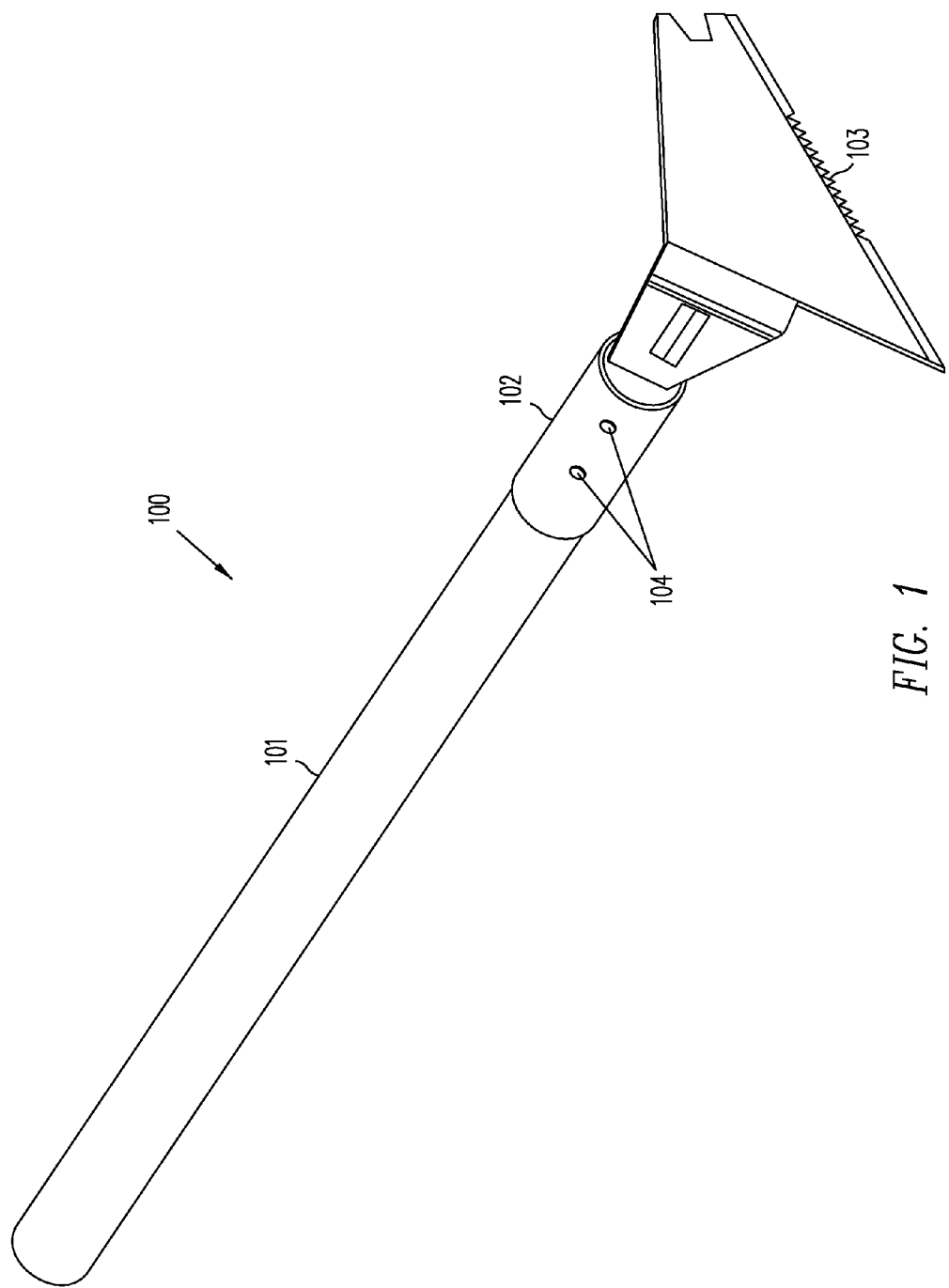
FIG. 1 shows hoe 100 of the present invention, in accordance with one embodiment of the present invention.
Figure 2:
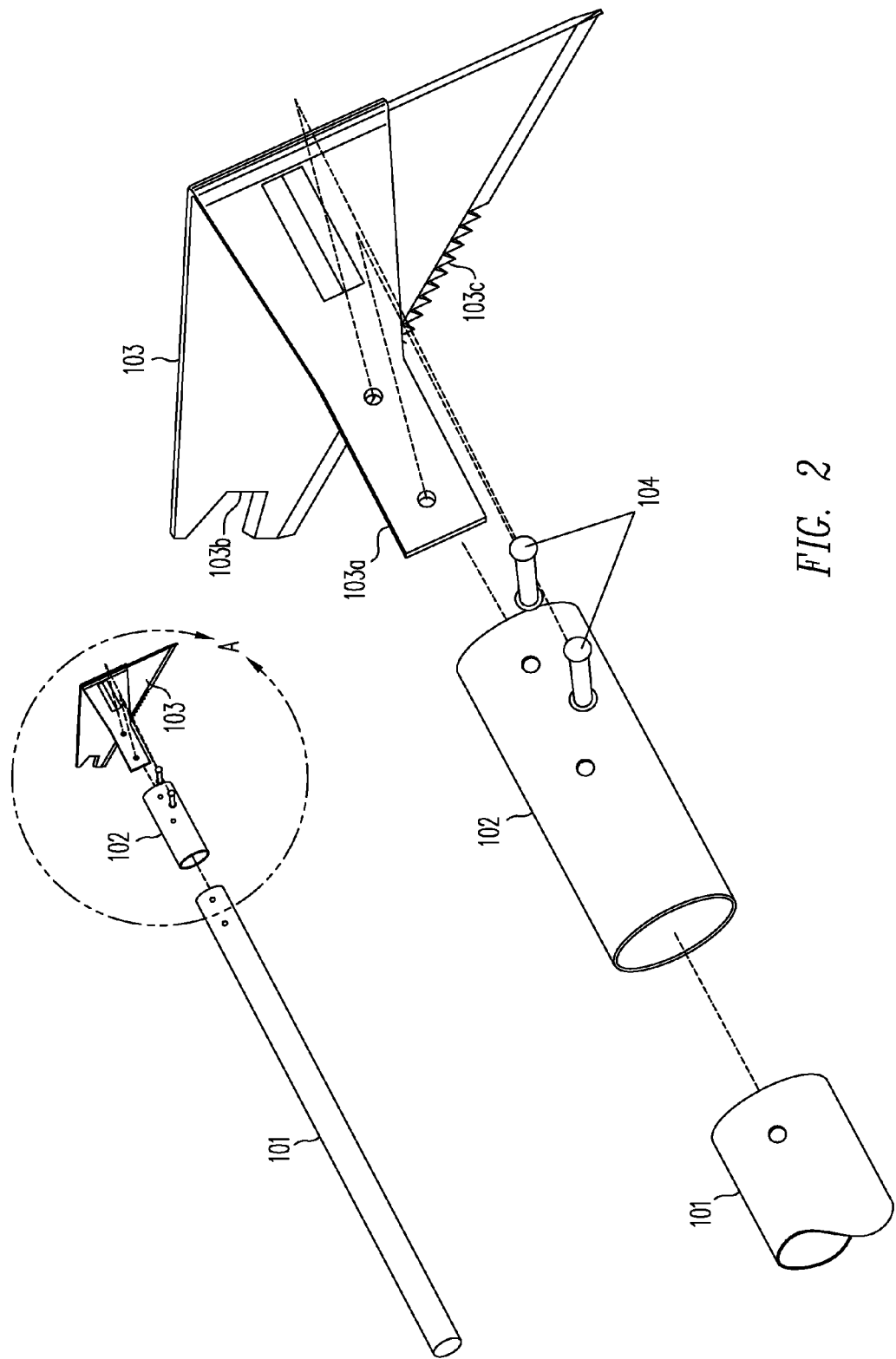
FIG. 2 shows the assembly arrangement of hoe 101, according to one embodiment of the present invention.

According to one embodiment, the present invention provides a hoe that can cut vegetation on or near the ground very effectively using a swinging motion, such as the motion similar to a golf swing or stroke. FIG. 1 shows hoe 100 of the present invention, in accordance with one embodiment of the present invention. As shown in FIG. 1, hoe 100 includes handle 101, reinforcing sleeve 102 and main blade 103. Handle 101 may be made of wood or similarly strong and resilient material. To be held comfortably by a person of average height, handle 101 may be approximately 4 feet or longer and 1.75 inches in diameter. Reinforcing sleeve 102 is provided to secure main blade 103 onto handle 101, using rivets (e.g., swage rivets 104) that are inserted into aligned through-holes provided in handle 101, reinforcing sleeves 102 and main blade 103. Instead of rivets, compatible nuts and bolts can also be used. Reinforcing sleeve 102 and main blade 103 may be formed out of a hardened metal or metal alloy, such as stainless steel. Hardening may be achieved by subjecting the metal to a high temperature, as known to those skilled in the art. Hardening also increases the durability of the sharpened cutting edges. FIG. 2 shows the assembly arrangement of hoe 101, described above, according to one embodiment of the present invention. FIG. 2 also shows main blade 103 in greater detail.

As shown in FIG. 2, main blade 103 includes a locking plate or key 103a for inserting into slot 105 provided in handle 103 (slot 105 is not seen in FIG. 2; see, FIG. 3), with the through-holes designed to be matched to the corresponding through-holes in reinforcing sleeve 102. Main blade 103 includes a cutting plate that has serrated or triangular teeth cutting edge 103c. Using a swinging motion, similar to a golf swing, a user may bring serrated cutting edge 103c along a substantially circular arc, to bear down and slide through the weeds or small vegetation at or near the ground level. In this manner, hoe 100 allows main blade 103 to reach confined and difficult to reach areas under a bush or a tree. The same swing motion allows hoe 100 to flatten a dirt surface in a garden seeding bed. Main blade 103 can also be used to steer soil or dirt to make a mound, or to mix fertilizers into soil. Main blade 103 also includes in the cutting plate additional cutting edge 103b at an end-plate portion. Additional cutting edge 103b may be used for cutting a small woody plant or branch. In one embodiment, main blade 103 is approximately 10.5 inches long and 4.5 inches wide.

Figure 3:
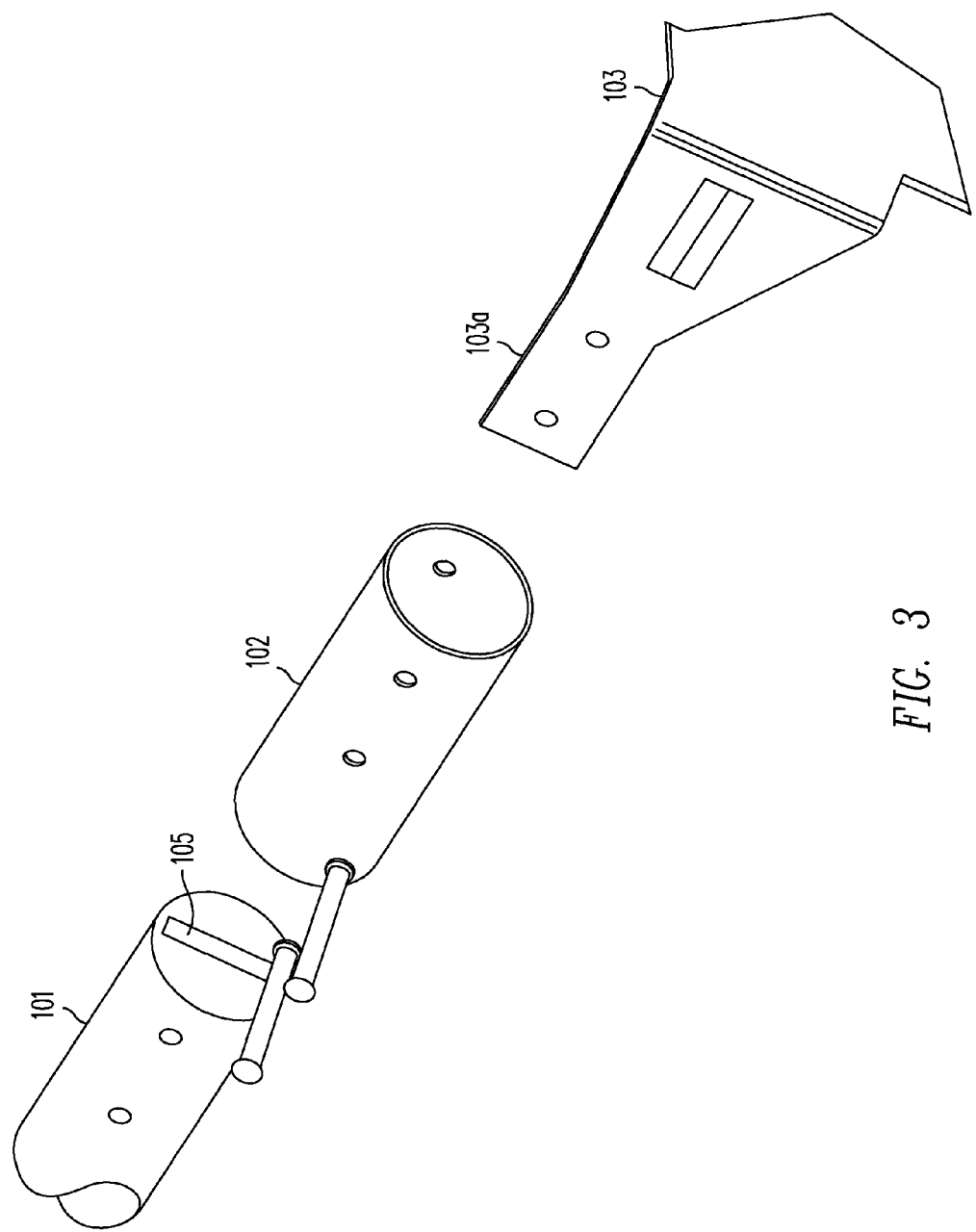
FIG. 3 illustrates the mating of main blade 103 to handle 101 by sliding reinforcing sleeve 102 over handle 101 and inserting locking plate 103a into slot 105, according to one embodiment of the present invention.

FIG. 3 illustrates the mating of main blade 103 to handle 101 by sliding reinforcing sleeve 102 over handle 101 and inserting locking plate 103a into slot 105, according to one embodiment of the present invention. FIGS. 1-3 shows a design of main blade 103 suitable for use by a left-handed person. A mirror image of main blade 103 (i.e., with additional cutting edge 103b facing an opposite direction) may be provided for a right-handed person.

Figure 4B:
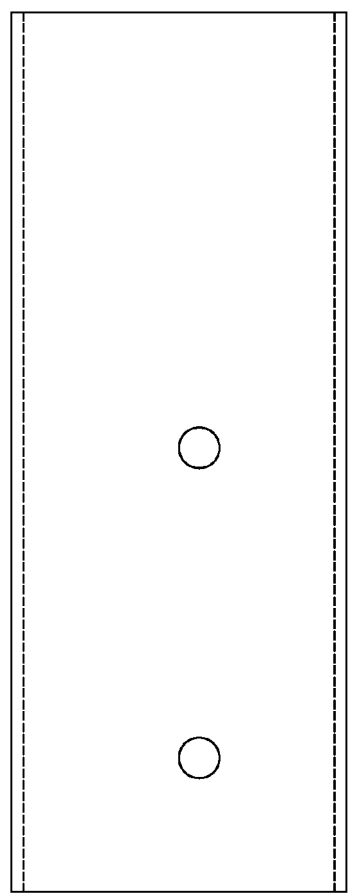
FIGS. 4a and 4b show, respectively, an edge-on view and a side view of reinforcing sleeve 102, according to one embodiment of the present invention.
Figure 4A:
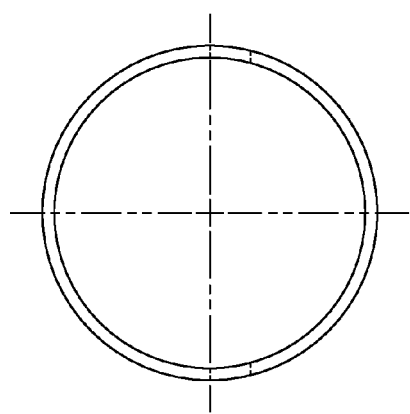

FIGS. 4a and 4b show, respectively, an edge-on view and a side view of reinforcing sleeve 102, according to one embodiment of the present invention. As shown in FIG. 4a, reinforcing sleeve 102 may have an inner diameter of 1.75 inches and an outer diameter of 1.87 inches (i.e., made out of a 0.12 inches thick hardened metal tubing). In one embodiment, as shown in FIG. 4b, reinforcing sleeve may be 5 inches long, with two 0.25 inches diameter through-holes placed 1.75 inches apart.

Figure 5B:
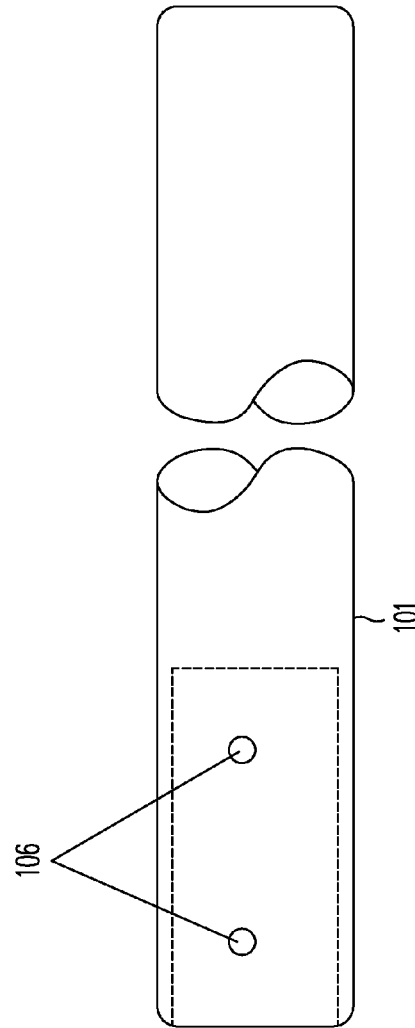
FIGS. 5a and 5b show, respectively, an edge-on view and a side view of handle 101, according to one embodiment of the present invention.
Figure 5A:
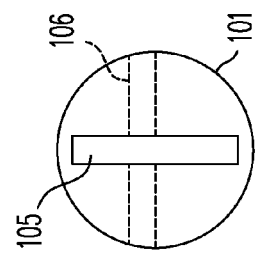

FIGS. 5a and 5b show, respectively, an edge-on view and a side view of handle 101, according to one embodiment of the present invention. As shown in FIG. 5a, slot 105, having a substantially rectangular cross section, is provided in handle 101 to receive locking plate 103a of main blade 103. Two or more through-holes 106, 0.25 inches in diameter each, are drilled in handle 101 to accommodate swage rivets 104.

Figure 6A:
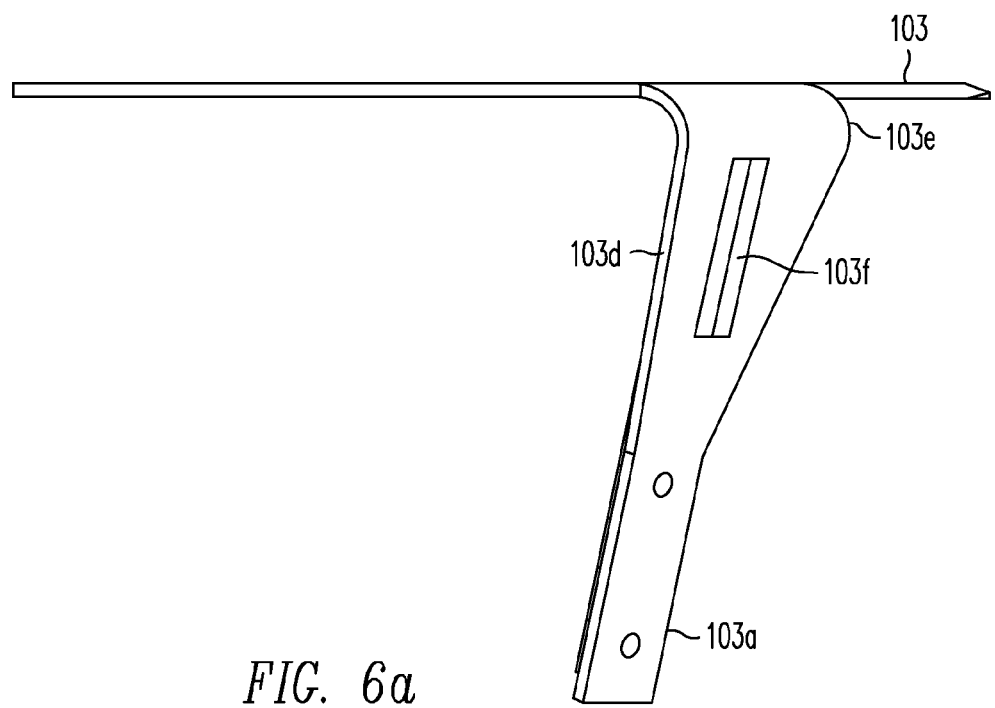
FIGS. 6a, 6b, 6c, 6d, 6e, 6f and 6g are various views of main blade 103, according to one embodiment of the present invention To facilitate comparison among the various figures, like elements are assigned like reference numerals.

FIGS. 6a, 6b, 6c, 6d, 6e, 6f and 6g are various views of main blade 103, according to one embodiment of the present invention. As shown in FIG. 6a, in addition to locking plate 103a, main blade 103 further includes reinforced portion 103d and curved portion 103e. Reinforced portion 103d is wider than locking plate 103a, and may include a cut-out portion 103f to provide additional strength. In one embodiment, cut-out portion 103f may be 2 inches long. Alternatively, rather than a cut-out portion, reinforced portion 103d may include a deformation, achieved by striking the surface of reinforced portion 103d. In one embodiment, the deformation may be $\frac{1}{16}$ inches deep. Curved portion 103e connects reinforced portion 103d to the cutting plate of main blade 103. Curved portions 103e, reinforced portion 103d, locking plate 103a and the cutting plate may be formed from a single metal sheet by bending. Alternatively, curved portions 103e, reinforced portion 103d, locking plate 103a may be formed separately from the cutting plate of main blade 103 and welded together after their respective formations.

Figure 6B:
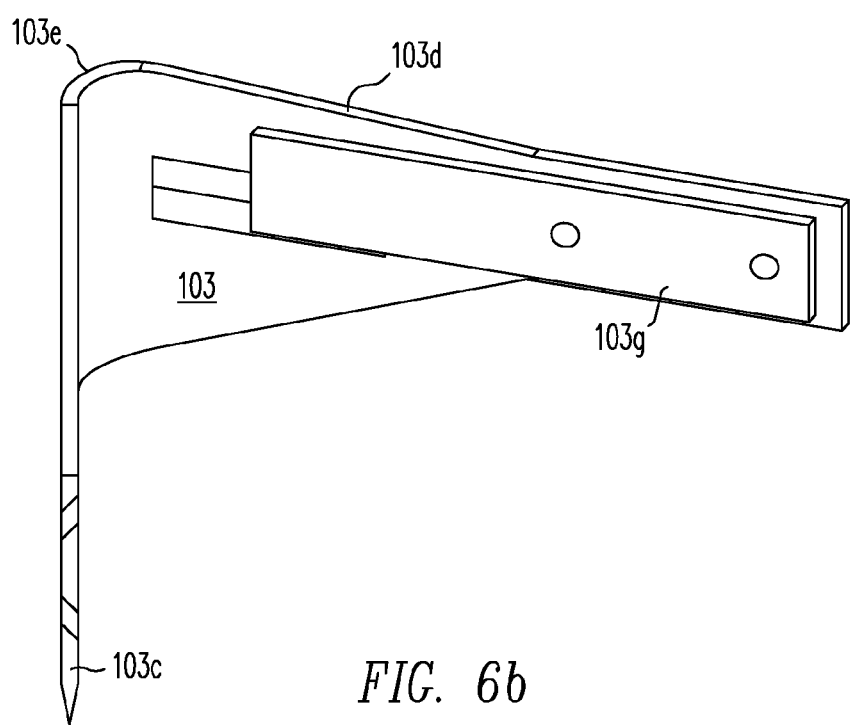

As shown in FIG. 6b, reinforced portion 103d may be reinforced by reinforcing plate 103g, which may be welded onto reinforced portion 103d. In one embodiment, reinforcing plate may be a 0.134 inches thick metal plate.

Figure 6C:
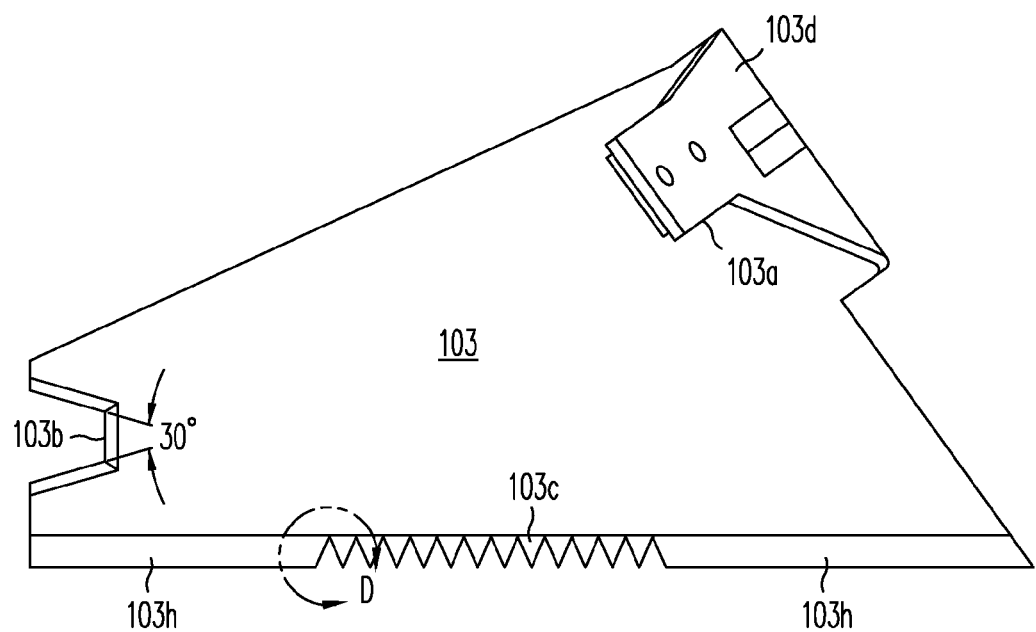
Figure 6D:
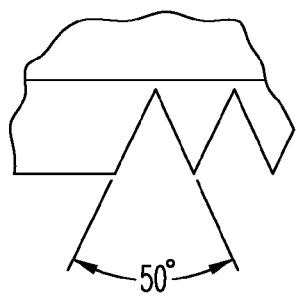

As shown in FIG. 6c, additional cutting edge 103b is 3-sided and may be honed on all three sides. In one embodiment, the two opposing side cutting surfaces subtend a 30° angle. The serrated cutting edge 103c includes a number of saw-teeth between honed portions 103h. In one embodiment, 16-20 saw-teeth may be provided. FIG. 6d shows that, in one embodiment, each sawtooth may be 0.3 inches long, with a 50° angle separation provided between adjacent saw-teeth.

Figure 6E:
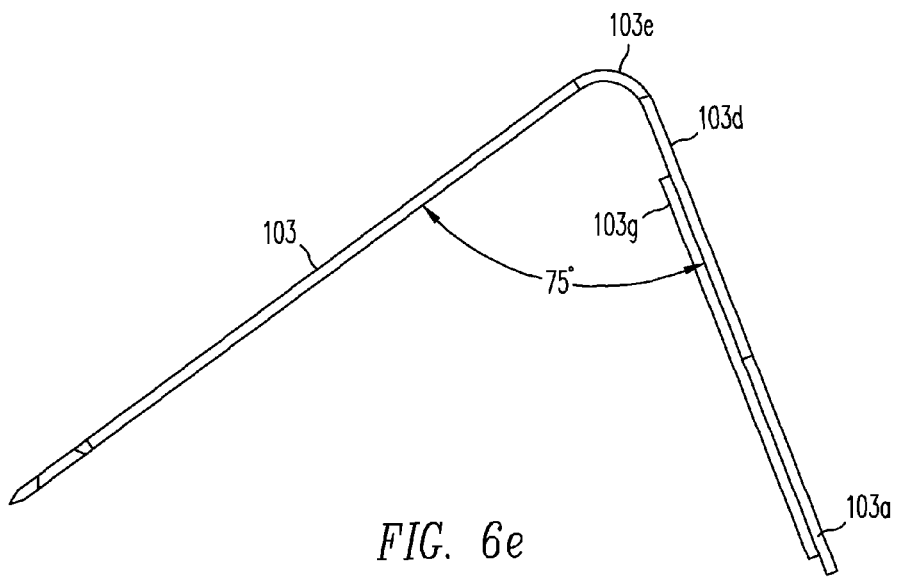
Figure 6F:
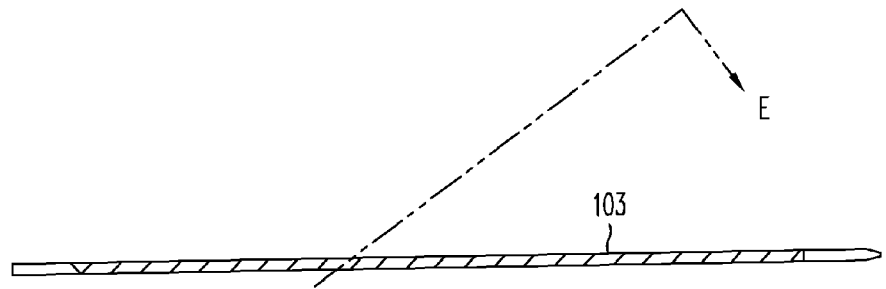
Figure 6G:
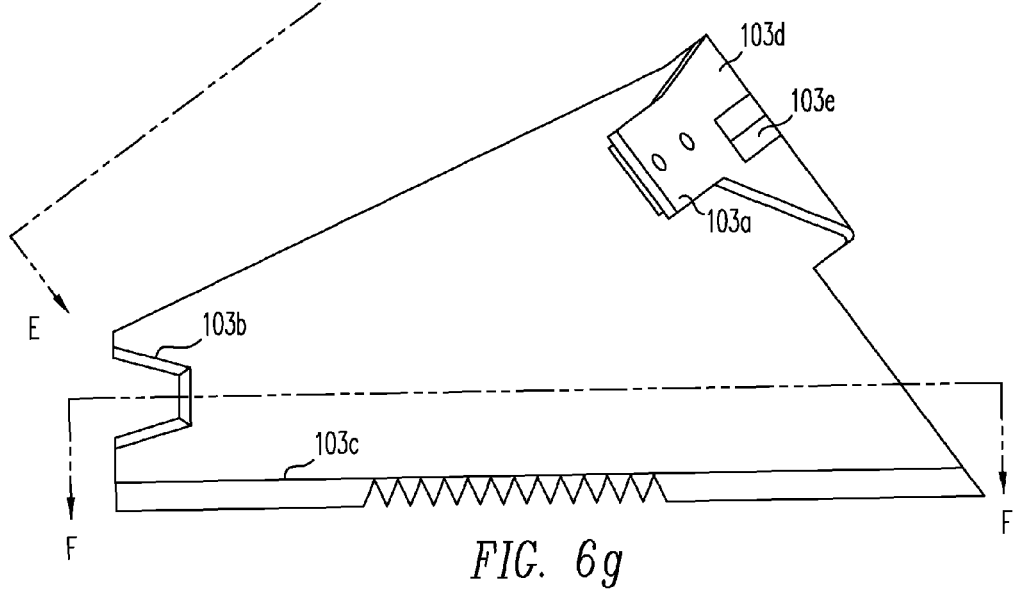

FIG. 6e shows that, in one embodiment, the cutting plate of main blade 103 is provided at an acute angle (e.g., 60°-85°, preferably 75°) relative to reinforced portion 103d. FIG. 6f shows a cross section of the cutting plate, along section line FF. Section line FF is indicated on FIG. 6g. The cutting plate may be 0.134 inches thick in one embodiment which is intended for a home-owner use. For heavy-duty use (i.e., for "professional" use), the cutting plate may be 0.18 inches thick.

The above detailed description is provided to illustrate the specific embodiments of the present invention and is not intended to be limiting. Numerous variations and modifications within the scope of the present invention are possible. The present invention is set forth in the following claims.

I claim:

1. A hoe, comprising:
   a handle;
   a cutting blade portion including a locking plate, a reinforced portion and a cutting plate having a planar surface with a narrow end and a broad end, the cutting plate having a serrated cutting edge at the broad end and an additional cutting edge between the broad end and the narrow end, wherein the locking plate secures the cutting blade portion to the handle,
   and wherein the reinforced portion connects the narrow end of the cutting plate to the locking plate, the reinforced portion comprising a reinforcing plate welded to the locking plate, and a curved portion connecting the reinforced portion to the cutting plate; and
   a reinforcing sleeve securing the locking plate to the handle.

2. A hoe as in claim 1, wherein the additional cutting edge is 3-sided and honed on all sides.

3. A hoe as in claim 1, wherein the serrated cutting edge comprises a plurality of saw-teeth provided between two honed cutting portions.

4. A hoe as in claim 1, wherein the locking plate is inserted into a slot provided in the handle.

5. A hoe as in claim 4, wherein through-holes are provided in the locking plate, the reinforcing sleeve and the handle, so as to allow the cutting blade portion to be secured to the handle by rivets or by nuts and bolts.

6. A hoe as in claim 1, wherein the reinforced portion and the planar surface of the cutting plate form a 60°-85° angle therebetween.

7. A hoe as in claim 1, wherein the cutting plate and the curved portion are formed by bending a single sheet of metal.

8. A hoe as in claim 1, wherein the cutting plate is welded to the curved portion.

9. A hoe as in claim 1, wherein the reinforced portion includes a rectangular cut-out.

10. A hoe as in claim 1, wherein the reinforced portion includes a deformation formed by striking.

11. A hoe as in claim 3, wherein the saw-teeth are 50° apart.

12. A hoe as in claim 1, wherein the cutting plate is between 0.134 and 0.18 inches thick.

13. A hoe as in claim 1, wherein the handle is 4 feet or longer.

14. A hoe as in claim 1, wherein the reinforcing sleeve comprises a cylindrical tube.

15. A hoe as in claim 1, wherein the planar surface and a longitudinal axis of the handle are at an acute angle greater than 65°.

* * * * *